United States Patent
Hu et al.

(10) Patent No.: US 11,877,178 B2
(45) Date of Patent: Jan. 16, 2024

(54) DATA TRANSMISSION METHOD AND APPARATUS

(71) Applicant: Huawei Technologies Co., Ltd., Shenzhen (CN)

(72) Inventors: Xingxing Hu, Shanghai (CN); Hongping Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/124,650

(22) Filed: Dec. 17, 2020

(65) Prior Publication Data

US 2021/0105657 A1    Apr. 8, 2021

Related U.S. Application Data

(63) Continuation of application No. PCT/CN2019/092193, filed on Jun. 21, 2019.

(30) Foreign Application Priority Data

Jun. 22, 2018 (CN) .......................... 201810653954.0

(51) Int. Cl.
H04W 76/12 (2018.01)
H04W 28/02 (2009.01)
(Continued)

(52) U.S. Cl.
CPC ....... H04W 28/0268 (2013.01); H04L 69/322 (2013.01); H04W 28/24 (2013.01);
(Continued)

(58) Field of Classification Search
CPC . H04W 28/0268; H04W 28/24; H04W 76/11; H04W 76/12; H04W 80/02;
(Continued)

(56) References Cited

U.S. PATENT DOCUMENTS

2017/0332282 A1    11/2017    Dao
2020/0213894 A1*   7/2020     Agiwal ............. H04W 28/0263
(Continued)

FOREIGN PATENT DOCUMENTS

CN          107493590 A        12/2017
CN          107637123 A        1/2018
(Continued)

OTHER PUBLICATIONS

Samsung (Initial considerations on the extended QFI, R2-1807901, May 2018).*

(Continued)

*Primary Examiner* — Lakeram Jangbahadur
(74) *Attorney, Agent, or Firm* — Slater Matsil, LLP

(57) ABSTRACT

Embodiments of this patent application provide a data transmission method and an apparatus for determining, by a core network (CN) device, a length of a quality of service flow identifier (QFI) used when a protocol data unit (PDU) session is established or modified for a terminal device; and sending, by the CN device, a first message to a radio access network (RAN) device, where the first message includes length information of at least one QFI. After receiving the first message from the core network CN device, the access network RAN sends a second message to the terminal device, where the second message includes the length information of the at least one QFI.

16 Claims, 8 Drawing Sheets

(51) Int. Cl.
*H04W 76/11* (2018.01)
*H04L 69/322* (2022.01)
*H04W 28/24* (2009.01)
*H04W 80/02* (2009.01)

(52) U.S. Cl.
CPC ............ *H04W 76/11* (2018.02); *H04W 76/12* (2018.02); *H04W 80/02* (2013.01)

(58) Field of Classification Search
CPC . H04W 28/0263; H04W 76/19; H04W 76/22; H04L 69/322; H04L 69/327
See application file for complete search history.

(56) References Cited

U.S. PATENT DOCUMENTS

| | | | |
|---|---|---|---|
| 2020/0280886 A1* | 9/2020 | Hori | H04W 76/10 |
| 2020/0296618 A1* | 9/2020 | You | H04W 28/0263 |
| 2021/0127295 A1* | 4/2021 | Jo | H04W 80/08 |
| 2021/0160727 A1* | 5/2021 | Jiang | H04L 47/2483 |
| 2022/0361044 A1* | 11/2022 | Kainulainen | H04W 28/0263 |

FOREIGN PATENT DOCUMENTS

| | | |
|---|---|---|
| CN | 109845320 A | 6/2019 |
| WO | 2018026169 A1 | 2/2018 |
| WO | WO-2018026169 A1 * | 2/2018 ........ H04W 28/0263 |
| WO | WO-2019029581 A1 * | 2/2019 ............ H04W 92/10 |
| WO | WO-2019153207 A1 * | 8/2019 ........ H04W 28/0268 |

OTHER PUBLICATIONS

RIM (Introduction of the structure description of the IE type and Length fields, GP-100383, May 2010).*
Kainulainen (U.S. Appl. No. 62/631,423), filed Feb. 2018.*
ZTE, "Discussion on the SDAP PDU format," 3GPP TSG-RAN WG2 Meeting #99, R2-1708125, Berlin, Germany, Aug. 21-25, 2017, 5 pages.
CATT, "SDAP header format," 3GPP TSG-RAN WG2 meeting #101bis, R2-1804489, Sanya, China, Apr. 16-20, 2018, 3 pages.
Ericsson, "Discussion on options to limit the size of QFI to 6 bits in RAN," SA WG2 Meeting #126, S2-171902, Feb. 26-30, 2018, Montreal, Canada, 3 pages.
MediaTek Inc., "Some considerations on SDAP header design," R2-1801151, 3GPP TSG-RAN2 Meeting AH-1801, Vancouver, Canada, Jan. 22-26, 2018, 3 pages.
Research in Motion UK Ltd., "Introduction of the structure description of the IE Typle and Length fields", 3GPP TSG-GERAN Meeting #45, GP-100383, Mar. 1-5, 2010, 36 Pages, Berlin, Germany.
Samsung, "Initial considerations on the extended QFI", 3GPP TSG-RAN WG2 #102, R2-1807901, May 21-25, 2018, 4 Pages, Busan, Korea.

* cited by examiner

| Bits | | | | | | | | Number of octets |
|---|---|---|---|---|---|---|---|---|
| 7 | 6 | 5 | 4 | 3 | 2 | 1 | 0 | |
| PDU type (=0) | | | | Spare | | | | 1 |
| Spare | | RQI or spare | QoS flow identifier | | | | | 1 |
| Padding | | | | | | | | 0-2 |

FIG. 9

| Bits | | | | | | | | Number of octets |
|---|---|---|---|---|---|---|---|---|
| 7 | 6 | 5 | 4 | 3 | 2 | 1 | 0 | |
| PDU Type (=2) | | | | Spare | | | | 1 |
| Spare | | RQI or spare | QoS flow identifier | | | | | 1 |
| QoS flow identifier | | | | | | | | 1 |
| Padding | | | | | | | | 0-2 |

FIG. 10

| Bits | | | | | | | | Number of octets |
|---|---|---|---|---|---|---|---|---|
| 7 | 6 | 5 | 4 | 3 | 2 | 1 | 0 | |
| PDU type (=0) | | | | QoS flow identifier length | | | | 1 |
| Spare | RQI or spare | QoS flow identifier | | | | | | 1 |
| QoS flow identifier | | | | | | | | 1 |
| Padding | | | | | | | | 0-2 |

DATA TRANSMISSION METHOD AND APPARATUS

CROSS-REFERENCE TO RELATED APPLICATIONS

This application is a continuation of International Application No. PCT/CN2019/092193, filed on Jun. 21, 2019, which claims priority to Chinese Patent Application No. 201810653954.0, filed on Jun. 22, 2018. The disclosures of the aforementioned applications are hereby incorporated by reference in their entireties.

TECHNICAL FIELD

The present disclosure relates to the field of wireless communications, and in particular, to a data transmission method and an apparatus.

BACKGROUND

With rapid development of wireless communications technologies, a fifth-generation (5G) wireless communications technology has become a popular research subject in the industry currently. 5G supports various types of network deployment and application types, including higher-rate experience and a higher-bandwidth access capability, lower-latency higher-reliability information exchange, access and management of massive low-cost machine-type communication devices, and the like. To meet the foregoing requirements, 5G defines a QoS management architecture based on a quality of service (QoS) flow, and defines a data packet transmission mechanism over an air interface based on a data radio bearer (DRB). For a protocol data unit (PDU) session of a terminal device, one or more data flows (for example, an Internet Protocol (IP) flow) may be included. One or more data flows with a same QoS requirement form one QoS flow. Therefore, one PDU session includes one or more QoS flows. Data packets in one or more QoS flows may be carried on one DRB for transmission. Same forwarding processing, such as a same scheduling policy, queue management policy, and rate matching policy, is performed on the data packets that are in one or more QoS flows and that are carried on one DRB.

One QoS flow in one PDU session is indicated by one corresponding QoS flow identifier (QFI). In an existing technical discussion result of Release 15 of 3GPP, a QFI is 6 bits in length. In other words, one PDU session may include 0 to 63 QoS flows. For communication in some scenarios, one PDU session may include more QoS flows. In this case, quantities of QoS flows included in different PDU sessions may vary greatly. Currently, there is no appropriate solution to effectively indicate QoS flows to perform efficient data transmission.

SUMMARY

Embodiments of this application provide a data transmission method that avoids resource waste and improves data transmission efficiency.

According to one aspect, an embodiment of this application provides a data transmission method. The method includes: determining, by a core network CN device, a length of a quality of service flow identifier QFI used when a protocol data unit PDU session is established or modified for a terminal device; and sending, by the CN device, a first message to an access network RAN device, where the first message includes length information of at least one QFI.

In one embodiment, the QFI length information is at least one of the following three parameters: a length value of the QFI, a value range of the QFI, or a length class of the QFI.

In one embodiment, QFIs of all quality of service QoS flows or QFIs of some QoS flows in one PDU session correspond to one piece of the QFI length information.

In one embodiment, the first message is a PDU session resource establishment request message, a PDU session resource update request message, or an initial context establishment message.

According to the foregoing operations in this embodiment of this application, the CN device can determine, based on a service requirement and/or a policy and charging control rule of the PDU session, a QFI length, and notify the RAN device of the QFI length, so that a QFI field of an appropriate length is carried during data transmission between the CN device and the RAN device. This avoids resource waste, and improves data transmission efficiency.

According to another aspect, an embodiment of this application provides a data transmission method. The method includes: receiving, by an access network RAN device, a first message from a core network CN device, where the first message includes length information of at least one quality of service flow identifier QFI; and sending, by the RAN device, a second message to a terminal device, where the second message includes the length information of the at least one QFI.

In one embodiment, the QFI length information is at least one of the following three parameters: a length value of the QFI, a value range of the QFI, or a length class of the QFI.

In one embodiment, QFIs of all quality of service QoS flows or QFIs of some QoS flows in one protocol data unit PDU session correspond to one piece of the QFI length information.

In one embodiment, the first message is a PDU session resource establishment request message, a PDU session resource update request message, or an initial context establishment message.

In one embodiment, the second message is a radio resource management RRC connection re-establishment request message, an RRC reconfiguration message or an RRC connection resume message.

According to the foregoing operations in this embodiment of this application, the RAN device can notify the terminal device of a QFI length determined by the CN device, so that a QFI field of an appropriate length is carried during data transmission between the RAN device and the terminal device. This avoids resource waste, and improves data transmission efficiency.

According to yet another aspect, an embodiment of this application provides a data transmission method. The method includes: determining, by a core network CN device, a length of a quality of service flow identifier QFI used when a protocol data unit PDU session is modified for a terminal device; and sending, by the CN device, a third message to an access network RAN device, where the third message includes a mapping relationship of at least one QFI.

In one embodiment, the QFI mapping relationship includes a correspondence between a QFI that is of a first length and that is used by at least one QoS flow in the PDU session before the PDU session is modified and a QFI that is of a second length and that is used by the at least one QoS flow after the PDU session is modified.

In one embodiment, the third message further includes length information of the at least one QFI.

In one embodiment, the QFI length information is at least one of the following three parameters: a length value of the QFI, a value range of the QFI, or a length class of the QFI.

In one embodiment, the third message is a PDU session resource update request message.

According to the foregoing operations in this embodiment of this application, the CN device can determine, based on a change of a service requirement and/or a policy and charging control rule of the PDU session, an updated QFI length, and notify the RAN device of a mapping relationship between a previous QFI and an updated QFI of each QoS flow, so that the updated QFI is carried during data transmission between the CN device and the RAN device. In this way, continuity of data transmission is maintained.

According to still another aspect, an embodiment of this application provides a data transmission method. The method includes: receiving, by an access network RAN device, a third message from a core network CN device, where the third message includes a mapping relationship of at least one QFI; and sending, by the RAN device, a fourth message to a terminal device, where the fourth message includes the mapping relationship of at least one QFI.

In one embodiment, the QFI mapping relationship includes a correspondence between a QFI that is of a first length and that is used by at least one QoS flow in the PDU session before the PDU session is modified and a QFI that is of a second length and that is used by the at least one QoS flow after the PDU session is modified.

In one embodiment, the QFI length information is at least one of the following three parameters: a length value of the QFI, a value range of the QFI, or a length class of the QFI.

In one embodiment, the third message is a PDU session resource update request message.

In one embodiment, the fourth message is an RRC reconfiguration message or an RRC connection resume message.

According to the foregoing operations in this embodiment of this application, the RAN device notifies the terminal device of a mapping relationship between a previous QFI and an updated QFI of each QoS flow, so that the updated QFI is carried during data transmission between the RAN device and the terminal device. In this way, continuity of data transmission is maintained.

According to another aspect, a core network device is provided for performing the method according to any one of the first aspect or the third aspect, or the possible implementations of the first or the third aspect. Specifically, the core network device may include a unit that is configured to perform the method according to any one of the first aspect or the third aspect, or the possible implementations of the first or the third aspect.

According to yet another aspect, an access network device is provided for performing the method according to any one of the second aspect or the fourth aspect, or the possible implementations of the second or the fourth aspect. Specifically, the access network device may include a unit that is configured to perform the method according to any one of the second aspect or the fourth aspect, or the possible implementations of the second or the fourth aspect.

According to still another aspect, a core network device is provided. The core network device includes a memory and a processor, where the memory is configured to store a computer program and the processor is configured to invoke the computer program from the memory and run the program, so that the core network device performs the method according to any one of the first aspect or the third aspect, or the possible implementations of the first or the third aspect.

According to another aspect, an access network device is provided. The access network device includes a memory and a processor, where the memory is configured to store a computer program and the processor is configured to invoke the computer program from the memory and run the program, so that the access network device performs the method according to any one of the second aspect or the fourth aspect, or the possible implementations of the second or the fourth aspect.

According to yet another aspect, a computer program product is provided. The computer program product includes computer program code. When the computer program code is run by a communication unit, a processing unit, a transceiver or a processor of a communication device (such as an access network device or a terminal device), the communication device is enabled to perform the method according to any one of the first aspect to the fourth aspect, or the possible implementations of the first aspect to the fourth aspect.

According to still another aspect, a computer-readable storage medium is provided. The computer readable-storage medium stores a program, and the program enables a computer to perform the method according to any one of the first aspect to the fourth aspect, or the possible implementations of the first aspect to the second aspect.

These and other aspects of the present disclosure are clearer and easier to understand in descriptions of the following (a plurality of) embodiments.

BRIEF DESCRIPTION OF THE DRAWINGS

The following briefly describes the accompanying drawings used for describing embodiments of this application or the current technology.

FIG. 9 is a schematic diagram of a format of a PDU session container according to an embodiment of this application;

FIG. 10 is a schematic diagram of a format of an enhanced PDU session container according to an embodiment of this application;

DETAILED DESCRIPTION OF ILLUSTRATIVE EMBODIMENTS

Figure 1:
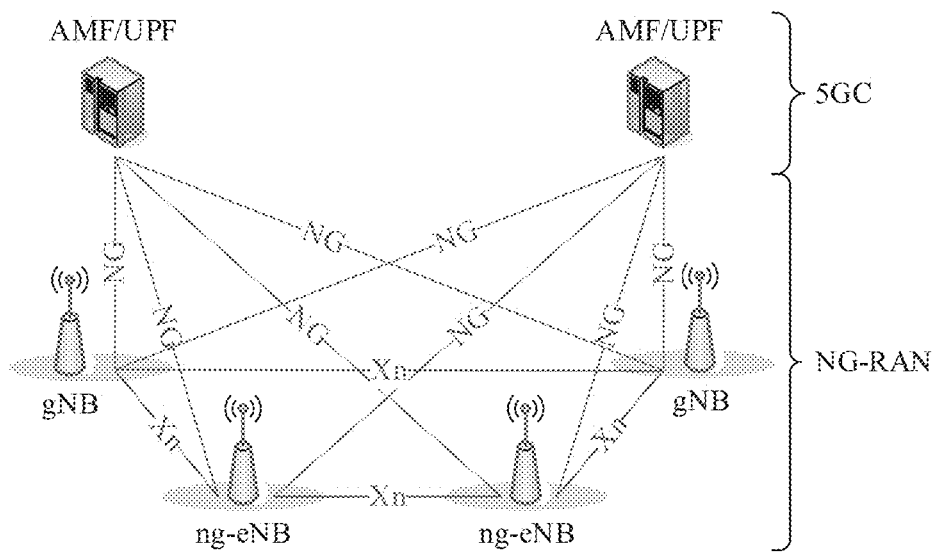
FIG. 1 is a network side part of a communications system according to an embodiment of this application.

The following describes the embodiments of this application with reference to the accompanying drawings in the embodiments of this application.

In this application, the word "example" is used to represent giving an example, an illustration, or a description. Any embodiment described as an "example" in this application should not be explained as being more preferred or having more advantages than another embodiment. To enable any person skilled in the art to implement and use the present disclosure, the following description is given. In the following description, details are set forth for the purpose of explanation. It should be understood by a person of ordinary skill in the art that the present disclosure can be implemented without these specific details. In other examples, well-known structures and processes are not described in detail to avoid obscuring the description of the present disclosure with unnecessary details. Therefore, the present disclosure is not limited to the embodiments described but extends to the widest scope that complies with the principles and features disclosed in this application.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those units, but may include other units not expressly listed or inherent to such a process, method, system, product, or device.

The terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

Specific embodiments are used below to describe in detail the technical solutions of the present disclosure. The following several specific embodiments may be combined with each other, and a same or similar concept or process may not be described repeatedly in some embodiments.

A data transmission method and apparatus provided in the embodiments of this application are applicable to data transmission of QoS flows that are between a terminal device and a network device and can be indicated by QoS flow identifiers of different lengths.

Usually, a communications system includes a terminal device and a network side device. FIG. 1 shows a network side part 100 of a communications system according to an embodiment of this application. The network side part 100 includes a next generation core (NGC) (also referred to as 5GC) and a next generation radio access network (NG-RAN). The 5GC mainly includes a control plane network element (such as a mobility management function (AMF) and a session management function (SMF)) and a user plane network element (UPF). The AMF is mainly responsible for access and mobility management of the terminal device. The SMF is mainly responsible for session management, terminal IP address assignment, and the like. The UPF is mainly responsible for data packet routing and forwarding, QoS management, and the like. The AMF, the SMF, and the UPF may also be referred to as core network (CN) devices. A network element in the NG-RAN mainly includes a next-generation base station, for example, a next-generation Node B (gNB), a next-generation evolved Node B (ng-eNB), or the like. The gNB and the ng-eNB are also referred to as RAN devices, and provide user plane and control plane functions. An interface between the 5GC and the NG-RAN may be defined as an NG interface. Specifically, a control plane interface between the 5GC and the NG-RAN may be defined as a next generation control plane (NG-C) interface, and a user plane interface between the 5GC and the NG-RAN may be defined as a next generation user plane (NG-U) interface. An interface between different network elements (such as two gNBs) in the NG-RAN may be defined as an Xn interface. It should be understood that names of the interfaces are examples, and the interfaces may be alternatively defined as other names. This is not limited in the embodiments of this application.

The network element in the NG-RAN in FIG. 1 may alternatively be an access point (AP) in a wireless local area network (WLAN), a base transceiver station (BTS) in GSM or CDMA, a NodeB (NB) in WCDMA, a relay station or an access point, a vehicle-mounted device, a wearable device, a network device in a future 5G network or an access network device in a future evolved public land mobile network (PLMN), for example, a transmission and reception point (TRP), a centralized processing unit (CU), or a distributed processing unit (DU). It should be understood that the terminal device communicates with the network element in the NG-RAN by using a transmission resource (such as a frequency domain resource or a spectrum resource) used by a cell managed by the network element in the NG-RAN. The cell may be a macro cell, a hyper cell, or a small cell. The small cell may be a metro cell, a micro cell, a pico cell, a femto cell, and the like. These small cells feature a small coverage area and low transmit power, and are applicable to providing a high-rate data transmission service.

It should be noted that, in terms of a RAN device in which a CU and a DU are separated, the CU and the DU may be physically separated or may be deployed together. A plurality of DUs may be connected to one CU. One DU may be connected to a plurality of CUs. The CU and the DU may be connected by using a standard interface (such as an F1 interface). Respective functions of the CU and the DU may be divided based on a protocol layer of a wireless network. For example, functions of a radio resource control (RRC) layer, a service data adaptation protocol stack (SDAP) layer, and a packet data convergence protocol (PDCP) layer are provided by the CU, and functions of a radio link control (RLC) layer, a media access control (MAC) layer and a physical (PHY) layer are provided by the DU. It should be understood that division of processing functions of the CU and the DU based on the protocol layer is merely an example, and functions of the CU and the DU may also be divided in another manner. For example, the CU or the DU may alternatively have some processing functions of a protocol layer after division. In a possible implementation, some functions of an RLC layer and a function of a protocol layer above the RLC layer are provided by the CU, and a remaining function of the RLC layer and a function of a protocol layer below the RLC layer are provided by the DU. In another possible implementation, the functions of the CU or the DU may be alternatively divided based on a service type or another system requirement. For example, division is performed based on a delay. A function whose processing time needs to meet a delay requirement is provided by the DU, and a function whose processing time does not need to meet the delay requirement is provided by the CU. In still another possible implementation, the CU may alternatively have one or more functions of a core network. One or more CUs may be provided in a centralized manner or a separated manner. For example, the CUs may be provided on a network side for centralized management. The DU may have a plurality of radio frequency functions, and the radio frequency functions may be remotely provided. Functions of the CU may be implemented by one entity, or may be implemented by different entities. For example, the functions of the CU may be further divided and a control plane (CP) and a user plane (UP) are separated, in other words, a control plane of the CU (CU-CP) and a user plane of the CU (CU-UP). For example, the CU-CP and the CU-UP may be implemented by different functional entities. The CU-CP and the CU-UP may be coupled to the DU to jointly perform functions of the RAN device. For example, the CU-CP is responsible for a control plane function, and mainly includes RRC and a PDCP-C. The PDCP-C is mainly responsible for data encryption and decryption, integrity protection, data transmission, and the like on the control plane. The CU-UP is responsible for the user plane functions, and mainly includes SDAP and a PDCP-U. The SDAP is mainly responsible for processing data of a core network and mapping a data flow to a radio bearer. The PDCP-U is mainly responsible for encryption and decryption, integrity protection, header compression, serial number maintenance, data transmission, and the like on a data plane. The CU-CP and the CU-UP may be connected by using a standard interface (such as an E1 interface). The CU-CP represents that the gNB is connected to the core network through the Ng interface, and is connected to the DU through F1-C. The CU-UP is connected to the DU through F1-U. Optionally, the CU-UP further includes the PDCP-C.

The terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a station (ST) in the WLAN, and may be a cellular phone, a cordless phone, a session initiation protocol (SIP) phone, a wireless local loop (WLL) station, a personal digital assistant (PDA) device, a hand-held device that has a wireless communication function, a relay device, a computing device, or another processing device connected to a wireless modem, a vehicle-mounted device, a wearable device, or a terminal device in a next-generation communications system, for example, a terminal device in a 5G network or a terminal device in a future evolved PLMN, and the like. By way of example but not limitation, in the embodiments of this application, the terminal device may alternatively be a wearable device. A wearable device may also be referred to as a wearable smart device, and is a general term for wearable devices that are smartly designed and developed by using wearable technologies, such as glasses, gloves, watches, apparels, and shoes. A wearable device is a portable device that can be worn directly on the body or integrated into the clothing or accessories of a user. The wearable device is not merely a hardware device, and can perform a powerful function based on software support, data exchange, and cloud interaction. Generalized wearable smart devices include rich-function and large-sized smart devices that can implement all or some functions without relying on a smartphone, such as smart watches or smart glasses, and also include smart devices that focus on a particular application function and need to work with another device such as a smartphone, such as various smart bands and smart jewelry that are used for sign monitoring.

Figure 2:
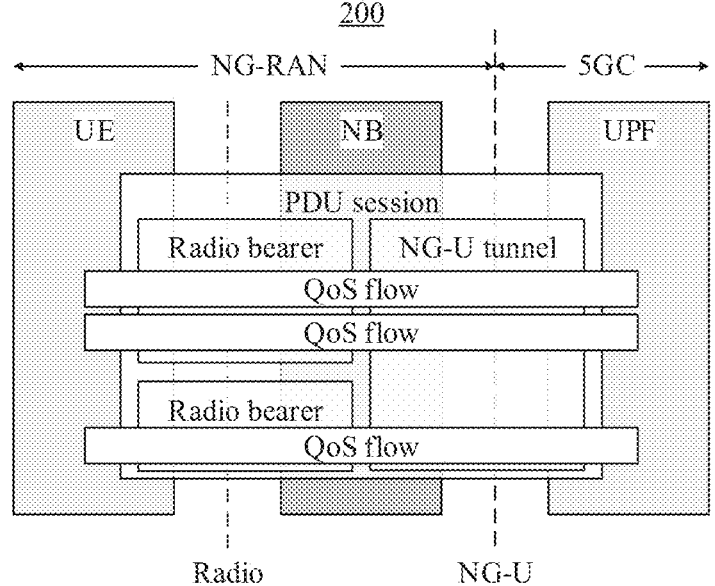
FIG. 2 is a QoS management architecture according to an embodiment of this application.

FIG. 2 shows a QoS management architecture 200 according to an embodiment of this application. The QoS management architecture 200 is applicable to a case in which an NG-RAN is connected to a 5GC, and is also applicable to a case in which an E-UTRA is connected to a 5GC. In the QoS management architecture, QoS management is performed, based on a QoS flow, on data transmission between a terminal device and a network side device. Specifically, QoS management at a non-access stratum (NAS) and an access stratum (AS) is included. Signaling and data transmission between a terminal device and an NG-RAN are operations at the AS layer, and signaling and data transmission between the terminal device and the 5GC are operations at the NAS layer. In the QoS management, one PDU session may include one or more IP flows and/or one or more types of data packets. At the NAS layer, a QoS flow is a minimum granularity for QoS differentiation of data packets in a PDU session.

Figure 3:
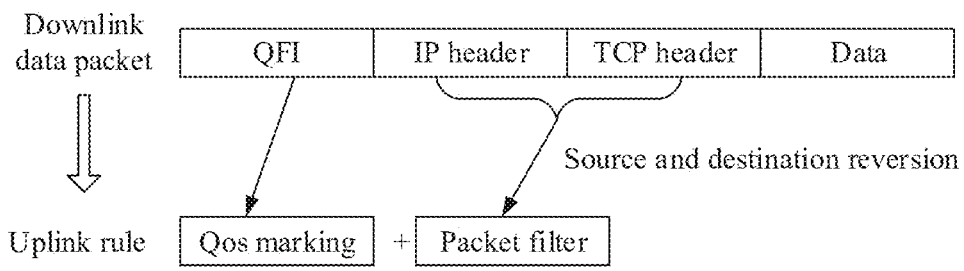
FIG. 3 is a schematic diagram of a format of downlink data that is transmitted on an NG-U tunnel and uplink data that is with reflective QoS according to an embodiment of this application.

The NAS layer is mainly responsible for a mapping relationship between an IP flow and/or another type of data packet and a QoS flow. For downlink data, the mapping relationship is established by a UPF by using a packet detection rule (PDR). For uplink data, the mapping relationship is established by the terminal device by using a QoS rule. In both the PDR and the QoS rule, a corresponding data packet is identified by using a packet filter, so that a QoS flow that the data packet belongs to is determined. Specifically, the packet filter determines the data packet by identifying a characteristic of the data packet. For example, for an IP data packet, the data packet is identified based on a source IP address, a destination IP address, a source port number, a destination port number, or a transport layer protocol number of the data packet. For the terminal device, the QoS rule may be obtained from the 5GC, through internal pre-configuration of the terminal device, or by using a reflective QoS feature. The reflective QoS feature means that the terminal device may generate, based on a correspondence between a received downlink data packet and a QoS flow, a correspondence between an uplink data packet and the QoS flow. For example, a downlink data packet whose source IP address is a first address, destination IP address is a second address, source port number is a first port number, destination port number is a second port number, and transport layer protocol number is a first protocol number is mapped from the UPF to a first QoS flow. If the NAS layer adopts the reflective QoS feature, the terminal device maps, to the first QoS flow, an uplink data packet whose source IP address is the second address, destination IP address is the first address, source port number is the second port number, destination port number is the first port number, and transport layer protocol number is the first protocol number. The 5GC can activate the reflective QoS feature by using a control plane or user plane. For example, the 5GC may notify, via an NG-C, the NG-RAN that a QoS flow has a reflective QoS feature. A header of a data packet that is sent to the NG-RAN from the 5GC carries a reflective QoS indicator (RQI), to indicate that the data packet has the reflective QoS feature. For any downlink data packet transmitted between the 5GC and the NG-RAN, the UPF carries a QoS flow identifier QFI in a header of the data packet transmitted on an NG-U tunnel, to indicate a QoS flow that the data packet belongs to. For any uplink data packet transmitted between the terminal device and the 5GC, the terminal device carries a QFI in a header of the data packet, to indicate a QoS flow that the data packet belongs to. FIG. 3 shows a downlink data packet that is transmitted on an NG-U tunnel and an uplink data packet that is with reflective QoS. For a downlink data packet, a protocol data unit (PDU) at an SDAP layer includes a QFI, an IP header, a transmission control protocol (TCP) header, and data content (Data). For an uplink data packet, an uplink QoS rule is to swap source and destination IP addresses, and source and destination port numbers. To be specific, the source address and the source port number of the uplink data packet are set as the destination address and the destination port number of the downlink data packet, and the destination address and the destination port number of the uplink data packet are set as the source address and the source port number of the downlink data packet. A terminal obtains a packet filter and a QFI of the uplink packet based on header information of the downlink data packet and the reflective QoS feature, and performs QoS marking using the QFI.

The AS layer is mainly responsible for a mapping relationship between a QoS flow and a data radio bearer (DRB). For downlink data, the NG-RAN configures, based on a mapping rule at the AS layer, the mapping relationship between a QoS flow and a DRB, and provides a QoS service for a QoS flow over an air interface by using the DRB. For uplink data, the NG-RAN notifies the terminal device of the mapping relationship between a QoS flow and a DRB. It should be understood that one or more QoS flows may be mapped to one DRB based on a QoS profile of each QoS flow, to be specific, one or more QoS parameters of a delay, a packet loss rate, a priority, a guaranteed rate, a maximum rate, and a notification indication of an inadequate rate of the QoS flow. Same forwarding processing is performed on data packets on a same DRB. As shown in FIG. 2, one PDU session of one terminal device includes three QoS flows. Between the NG-RAN and the 5GC, the three QoS flows are transmitted on one NG-U tunnel. Between the terminal device and the NG-RAN, two of the three QoS flows are mapped to one radio bearer, and the other QoS flow is mapped to another radio bearer for transmission. The NG-RAN may configure a mapping relationship between uplink transmission of a QoS flow and a DRB for the terminal device by using RRC signaling or through reflective mapping. The reflective mapping means that the terminal device maps, by detecting a QFI carried in a downlink data packet, an uplink data packet in a QoS flow having a same QFI to a DRB that carries the downlink data packet. In other words, the uplink data packet and the downlink data packet are carried on a same DRB. For example, a downlink data packet in a QoS flow is mapped to a first DRB. If the AS layer uses the reflective mapping, an uplink data packet in the QoS flow is also mapped to the first DRB.

Figure 4:
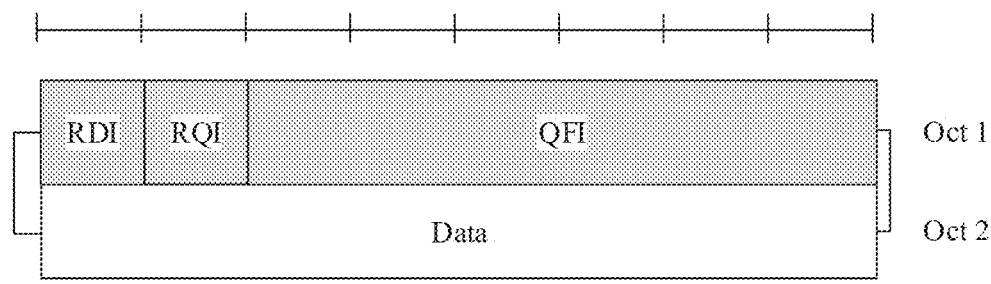
FIG. 4 is a format of an SDAP protocol data unit according to an embodiment of this application.

Different from a protocol stack of an LTE system, an SDAP layer is added above a packet data convergence protocol (PDCP) layer for an NG-RAN device and a terminal device in a 5G system. One PDU session corresponds to one SDAP entity. The SDAP layer is responsible for mapping between a QoS flow and a DRB, and may add a QFI corresponding to the QoS flow to a header of a data packet in the QoS flow. The NG-RAN may configure, by using an RRC message, whether an uplink data packet or a downlink data packet on a DRB of the terminal device carries an SDAP header. When it is configured that the downlink data packet needs to carry the SDAP header, the SDAP layer of the RAN device needs to carry a QFI in each downlink data packet. When it is configured that the uplink data packet needs to carry the SDAP header, the SDAP layer of the terminal device needs to carry a QFI in each uplink data packet. FIG. 4 shows a format of an SDAP protocol data unit, where an RDI field, an RQI field, and a QFI field form a header of the SDAP protocol data unit. The RDI field is used to indicate whether an AS layer executes reflective mapping. The RQI field is used to indicate whether the NAS layer executes reflective QoS. According to an existing technical discussion result of Release 15 of 3GPP, a QFI in a current SDAP header is 6 bits in length. This indicates that one PDU session may include 0 to 63 QoS flows. The inventor finds that one PDU session may include even more QoS flows, so that the QFI length is greater than 6 bits. In addition, quantities of QoS flows included in different PDU sessions may vary greatly, and a quantity of QoS flows included in one PDU session may also dynamically change. Currently, there is no appropriate solution to effectively identify QoS flows in different cases and efficiently perform data transmission. Therefore, the embodiments of this application provide a technical solution for data transmission of different QFI lengths.

Embodiment 1

Figure 5:
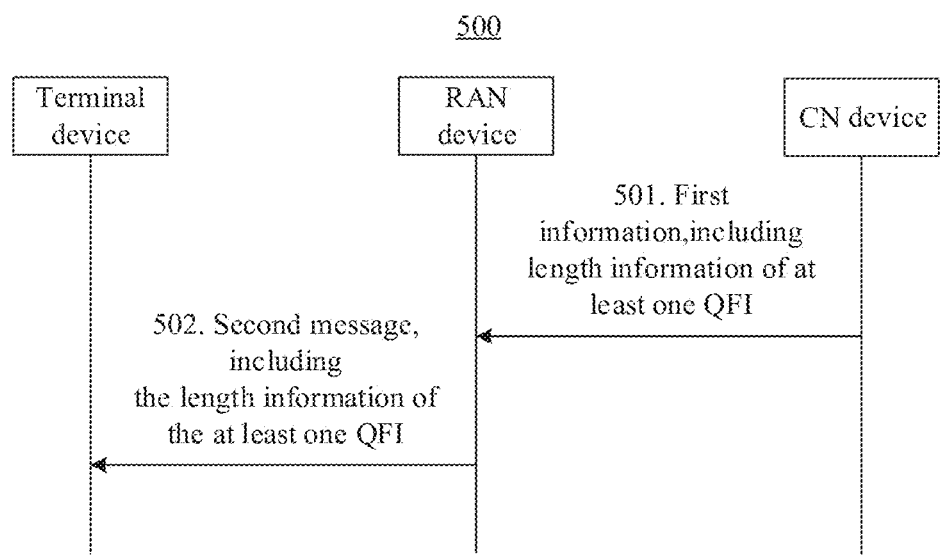
FIG. 5 is a schematic flowchart of a method for configuring a QFI length according to an embodiment of this application.

FIG. 5 shows a schematic flowchart of a method for configuring a QFI length according to an embodiment of this application. It should be understood that FIG. 5 is the schematic flowchart of the method for configuring the QFI length according to this embodiment of this application, and shows detailed communication operations or operations of the method. However, these operations or operations are merely examples. Other operations or variations of the operations in FIG. 5 may be further performed in this embodiment of this application. In addition, the operations in FIG. 5 may be separately performed in a sequence different from that shown in FIG. 5, and not all the operations in FIG. 5 may be necessarily performed. The method 500 may be applied to a scenario in which a PDU session of a terminal device is established or updated shown in FIG. 2. The procedure includes the following operations.

S501. A CN device sends a first message to a RAN device, where the first message includes length information of one or more QFIs.

The CN device determines, based on a service requirement and/or a policy and charging control rule of the PDU session of the terminal device, a length of a QFI used to establish or modify the PDU session for the terminal device, and the CN device needs to notify the RAN device of the length information of the QFI by using signaling, so that the RAN device can correctly parse a data packet of a QoS flow received from the CN device and/or send, to the CN device, a data packet of a QoS flow that can be correctly parsed.

In a possible implementation, for one PDU session, the CN device sends the length information of the QFI used by the PDU session to the RAN device. In this case, a same QFI length is used for all QoS flows in the PDU session. For example, one PDU session includes three QoS flows, where the three QoS flows are identified separately by using QFIs that are 6 bits in length.

In another possible implementation, for one PDU session, the CN device sends the length information of the plurality of QFIs used by the PDU session to the RAN device. In this case, different QFI lengths may be used for different QoS flows in the PDU session. For example, one PDU session includes three QoS flows. A first QoS flow may be identified by using a QFI with a length of 6 bits, a second QoS flow may be identified by using a QFI with a length of 8 bits, and a third QoS flow may be identified by using a QFI with a length of 10 bits. Alternatively, the first QoS flow and the second QoS flow may be identified by using QFIs with a length of 6 bits, and the third QoS flow may be identified by using a QFI with a length of 10 bits.

In this operation, the length information of the QFI may indicate the QFI length in a plurality of forms.

In a possible implementation, the length information of the QFI may be a length value of the QFI. For example, length information of one QFI is a length value of the QFI, such as 6 bits, 8 bits, or 10 bits.

In another possible implementation, the length information of the QFI may be a value range of the QFI. For example, length information of one QFI is a value range of the QFI, for example, 0 to 63 (the value range corresponds to a QFI length of 6 bits), 0 to 255 (the value range corresponds to a QFI length of 8 bits), or 0 to 1023 (the value range corresponds to a QFI length of 10 bits).

In still another possible implementation, the length information of the QFI may be a length class of the QFI. For example, length information of one QFI is a length class of the QFI, such as a long QFI or a short QFI. In this implementation, a standard specifies or an operator defines different QFI lengths, such as 6 bits and 10 bits, that can be used by a network side and the terminal device. In addition, both the network side and the terminal device have obtained the information before the PDU session is established. In this case, if the QFI length information sent by the CN device to the RAN device is a short QFI, it indicates that the QFI length used by the CN device is 6 bits. If the QFI length information sent by the CN device to the RAN device is a long QFI, it indicates that the QFI length used by the CN device is 10 bits. Further, the CN device may perform indication by using a 1-bit field, for example, configure a bit value of the field as "0" to indicate that a short QFI is used, or configure a bit value of the field as "1" to indicate that a long QFI is used. Alternatively, the length class of the QFI may be a plurality of classes, for example, a long QFI, a medium QFI, and a short QFI. In this implementation, a standard specifies or an operator determines that three or more different QFI lengths, such as 6 bits, 8 bits and 10 bits, can be used by a network side and the terminal device. In addition, both the network side and the terminal device have obtained the information before the PDU session is established. In this case, if the QFI length information sent by the CN device to the RAN device is a short QFI, it indicates that the QFI length used by the CN device is 6 bits. If the QFI length information sent by the CN device to the RAN device is a medium QFI, it indicates that the QFI length used by the CN device is 8 bits. If the QFI length information sent by the CN device to the RAN device is a long QFI, it indicates that the QFI length used by the CN device is 10 bits. Further, the CN device may perform indication by using a 2-bit field, for example, configure a bit value of the field as "00" to indicate that the short QFI is used, configure a bit value of the field as "01" to indicate that the medium QFI is used, or configure a bit value of the field as "10" to indicate that the long QFI is used.

It should be understood that in this operation, the QFI length information that is included in the first message is applied to both uplink transmission and downlink transmission of a QoS flow. In other words, a same QFI length is used for the uplink transmission and the downlink transmission. Alternatively, the first message may separately include QFI length information of uplink transmission and QFI length information of downlink transmission of one QoS flow. In a possible implementation, for one PDU session, the first message includes QFI length information of uplink transmission and QFI length information of downlink transmission of all QoS flows in the PDU session. In another possible implementation, for one PDU session, the first message includes QFI length information of uplink transmission and QFI length information of downlink transmission of one or more QoS flows in the PDU session.

In this operation, the first message is used for the CN device to indicate the RAN device to establish or modify the PDU session for the terminal device. Optionally, the first message may be a PDU session resource setup request message, a PDU session resource modification request message, an initial context setup request message, or the like.

S502. The RAN device sends a second message to the terminal device, where the second message includes the length information of the one or more QFIs.

The RAN device obtains, from the CN device, the length of the QFI used in the PDU session of the terminal device, and the RAN device needs to notify the terminal device of the length information of the QFI by using signaling, so that the terminal device can correctly parse a DRB data packet that carries a QoS flow received from the RAN device and/or send, to the RAN device, a DRB data packet that carries a QoS flow and that can be correctly parsed.

Similar to the implementation in operation 501, for one PDU session, the RAN device sends the length information of one QFI to the terminal device. The QFI length information is for all QoS flows in the PDU session. The RAN device may further send the length information of a plurality of QFIs to the terminal device, where the length information of the plurality of QFIs is for different QoS flows. In addition, one piece of QFI length information sent by the RAN device to the terminal device may be for all QoS flows in one DRB.

In this operation, the QFI length information may also be represented in a plurality forms similar to those in operation 501, for example, the QFI length value, the QFI value range, or the QFI length class. The QFI length information may be alternatively indicated by using another implicit method, for example, indirectly indicated by using other information. For example, the RAN device notifies the terminal device of length information of an SDAP header. When a length of the SDAP header falls within different ranges, different QFI lengths are implicitly indicated. For example, when the length of the SDAP header is greater than 1 byte, it indicates that the QFI length is 8 bits. When the length of the SDAP header is less than or equal to 1 byte, it indicates that the QFI length is 6 bits. In addition, the QFI length information that is included in the second message may be applied to both uplink transmission and downlink transmission of one QoS flow at the same time, or applied to uplink transmission and downlink transmission of one QoS flow separately.

In this operation, the second message is used for the RAN device to establish or reconfigure an RRC connection for the terminal device. Optionally, the second message may be an RRC connection re-establishment message, an RRC reconfiguration message, an RRC connection resume message, or the like. Further, the length information of the one or more QFIs included in the second message may be carried in a DRB establishment or modification field that is in the second message, for example, carried in an SDAP configuration field of the DRB. Table 1 shows a way of carrying a QFI length in an SDAP configuration field.

TABLE 1

| SDAP configuration field |  |
| --- | --- |
| SDAP-Config ::= | SEQUENCE { |
| pdu-Session | PDU-SessionID, |
| -- FFS: separate configuration for UL and DL | |
| sdap-HeaderDL | ENUMERATED { present, absent}, |
| sdap-HeaderUL | ENUMERATED { present, absent}, |
| defaultDRB | BOOLEAN, |
| sdap-LengthInfo | ENUMERATED { 8bit, 12bit,...} |

The sdap-LengthInfo field is used to configure the length of the SDAP header. As shown in FIG. 4, when a value of the field is 8 bits, it indicates that the QFI length is 6 bits. When the value of the field is 12 bits, it indicates that the QFI length is 10 bits. In this manner, the QFI length information is implicitly indicated by configuring the length of the SDAP header. Optionally, in the DRB configuration field, a new field (for example, a QFI-LengthInfo field) may also be used to explicitly indicate the QFI length information. It should be understood that if the QFI length information is for all QoS flows in the PDU session, one PDU session in one SDAP configuration only needs to include one piece of QFI length information. If the QFI length information is for each QoS flow in the PDU session, one PDU session in one SDAP configuration needs to include a plurality of pieces of QFI length information, and one piece of length information of a QFI corresponds to a DRB to which a QoS flow indicated by the QFI is mapped. The QFI length information may alternatively be for all QoS flows in one DRB. Different QFI length information may be configured for different DRBs in one PDU session, or same QFI length information may be configured for different DRBs in one PDU session.

In addition, in a CU-DU application scenario, after obtaining the QFI length information from the CN device, a CU-CP notifies, by using signaling (for example, an SDAP configuration message), a CU-UP of QFI length information of a corresponding PDU session or DRB.

Before operation 501, the terminal device may report, to the CN device by using NAS signaling, a capability of the terminal device to support QFIs of different lengths. The terminal device may further report, to the RAN device by using AS signaling, a capability of the terminal device to support QFIs of different lengths. The CN device may send, to the RAN device, the capability of the terminal device to support QFIs of different lengths, where the capability is obtained by the CN device. The RAN may also send, to the CN device, the capability of the terminal device to support QFIs of different lengths, where the capability is obtained by the RAN device. The RAN device may further report, to the CN device, a capability of the RAN device to support QFIs of different lengths, for example, by carrying a corresponding indication in an NG setup request message, a RAN configuration update acknowledge message, an AMF configuration update acknowledge message, or an NG reset message. The RAN device may notify the CN device of a capability of the RAN device that the RAN device does not support a longer QFI (for example, does not support a QFI longer than 6 bits), for example, by carrying a corresponding indication in a cause field in an AMF configuration update failure/error indication message. The CN device may further notify the RAN device of a capability of the CN device to support QFIs of different lengths, for example, by carrying a corresponding indication in an NG setup response message, a RAN configuration update acknowledge message, an AMF configuration update message, or an NG reset message. The CN device may notify the RAN device of a capability of the CN device that the CN device does not support a longer QFI (for example, does not support a QFI longer than 6 bits), for example, by carrying a corresponding indication in a cause field in an NG setup failure message or a RAN configuration update failure/error indication message. In this way, the CN device learns the capability of the RAN device to support QFIs of different lengths and the capability of the terminal device to support QFIs of different lengths, to determine the length of the QFI used when the PDU session is established or modified for the terminal device. In an example, the CN device determines, based on a quantity of QoS flows of a PDU session, that a QFI with a length of 8 bits needs to be used, the RAN device supports a QFI with a maximum length of 10 bits, and the terminal device supports a QFI with a maximum length of 8 bits, so that the CN device determines to use a QFI with the length of 8 bits for the PDU session. In another example, the CN device determines, based on a quantity of QoS flows of a PDU session, that a QFI with a length of 8 bits needs to be used, the RAN device supports a QFI with a maximum length of 10 bits, while the terminal device supports a QFI with a maximum length of 6 bits, so that the CN device determines to use a QFI with the length of 6 bits for the PDU session.

According to the foregoing operations, the length of the QFI used when data is transmitted between the terminal device and the RAN device, and between the RAN device and the CN device is determined. Optionally, after the terminal device receives the QFI length information from the RAN device, an RRC layer or an SDAP layer of the terminal device may notify a PDCP layer of a QFI length of a corresponding PDU session, so that the PDCP layer knows content on which encryption/decryption and header compression/header decompression are performed.

Figure 6:
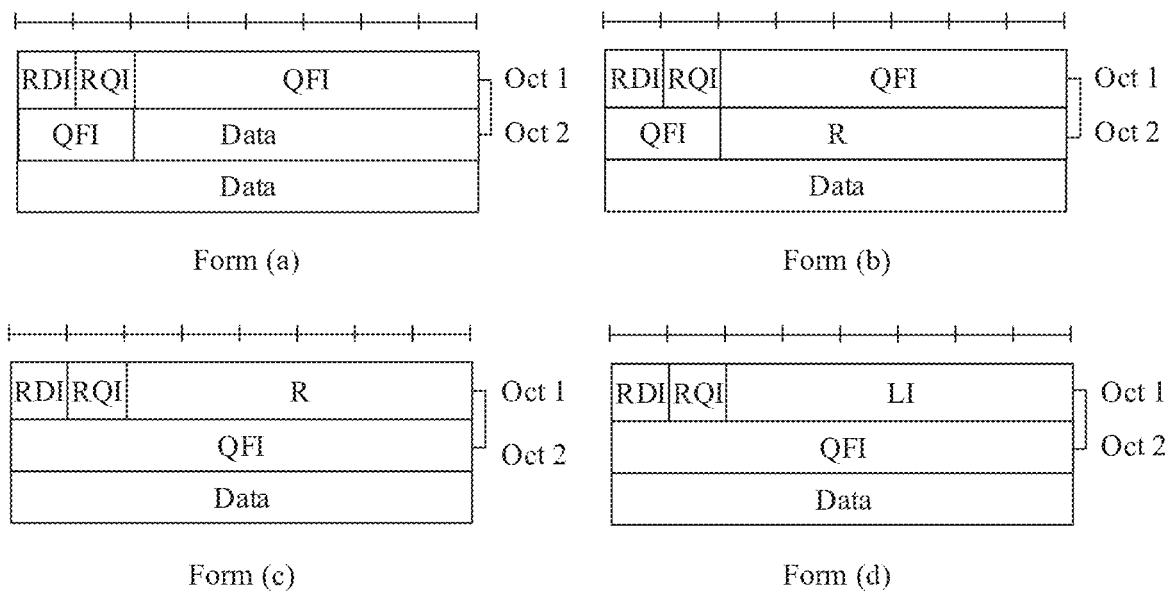
FIG. 6 is several possible forms of an SDAP header according to an embodiment of this application.
Figure 7:
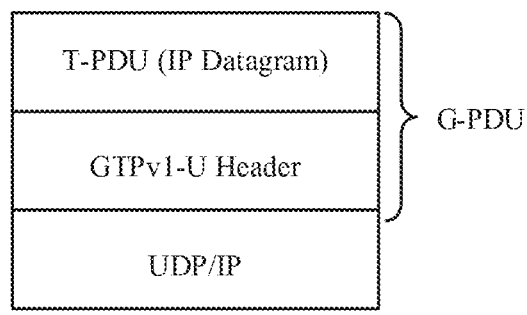
FIG. 7 is a schematic diagram of protocol encapsulation of a GTP-U tunnel according to an embodiment of this application.

During data transmission, each device encapsulates a data packet based on a determined QFI length. For example, for downlink transmission, downlink data of a QoS flow sent by the CN device to the RAN device on an NG-U tunnel is encapsulated by using a GPRS tunneling protocol-user plane (GTP-U). After receiving a downlink data packet from the CN device, the RAN device encapsulates the data packet at the SDAP layer. FIG. 6 shows several possible forms of an SDAP header at an SDAP layer. Assume that it is determined through the foregoing operations that the length of the QFI is 8 bits. In form (a), a QFI field occupies 8 bits, and is followed by Data. It should be understood that the Data is equivalent to data that is sent by a UPF and that includes an IP header, a TCP header, and content of a downlink data packet. In form (b), a QFI field occupies 8 bits, followed by a reserved field (R) with a length of 6 bits, and then followed by Data. In form (c), a 6-bit reserved field (R) is padded before a QFI field, so that the QFI field starts from an integral byte, for example, the QFI field starts from a first bit of the second byte (Oct2) shown in the figure. Alternatively, form (d) may be used. In this form, a length indicator (LI) field is added before a QFI field to indicate the length of the QFI. FIG. 7 shows a basic form of GTP-U encapsulation. A T-PDU corresponds to service data (such as IP data), and a Next Extension Header Type field in a GTPv1-U header (for a specific format, refer to Table 2) may indicate that a content of a next header is an extension header of a PDU session container. A format of the extension header of the PDU session container is shown in Table 3. The PDU session container includes QFI information.

TABLE 2

Content of a GTPv1-U header

| Octets | Bits | | | | | | | |
|---|---|---|---|---|---|---|---|---|
| | 8 | 7 | 6 | 5 | 4 | 3 | 2 | 1 |
| 1 | Version | | | PT | (*) | E | S | PN |
| 2 | Message Type | | | | | | | |
| 3 | Length ($1^{st}$ Octet) | | | | | | | |
| 4 | Length ($2^{nd}$ Octet) | | | | | | | |
| 5 | Tunnel Endpoint Identifier ($1^{st}$ Octet) | | | | | | | |
| 6 | Tunnel Endpoint Identifier ($2^{nd}$ Octet) | | | | | | | |
| 7 | Tunnel Endpoint Identifier ($3^{rd}$ Octet) | | | | | | | |
| 8 | Tunnel Endpoint Identifier ($4^{th}$ Octet) | | | | | | | |
| 9 | Sequence Number ($1^{st}$ Octet)[1) 4)] | | | | | | | |
| 10 | Sequence Number ($2^{nd}$ Octet)[1) 4)] | | | | | | | |
| 11 | N-PDU Number[2) 4)] | | | | | | | |
| 12 | Next Extension Header Type[3) 4)] | | | | | | | |

NOTE 0:
(*) This bit is a spare bit. It shall be sent as '0'. The receiver shall not evaluate this bit.
NOTE 1:
[1)]This field shall only be evaluated when indicated by the S flag set to 1.
NOTE 2:
[2)]This field shall only be evaluated when indicated by the PN flag set to 1.
NOTE 3:
[3)]This field shall only be evaluated when indicated by the E flag set to 1.
NOTE 4:
[4)]This field shall be present if and only if any one or more of the S, PN and E flags are set.

TABLE 3

Content of an extension header of a PDU session container

| Octets | Bits | | | | | | | |
|---|---|---|---|---|---|---|---|---|
| | 8 | 7 | 6 | 5 | 4 | 3 | 2 | 1 |
| 1 1 | 0xn | | | | | | | |
| 2 – (4n – 1) | PDU Session Container | | | | | | | |
| 4n | Next Extension Header Type (NOTE) | | | | | | | |

Figures 11, 12:
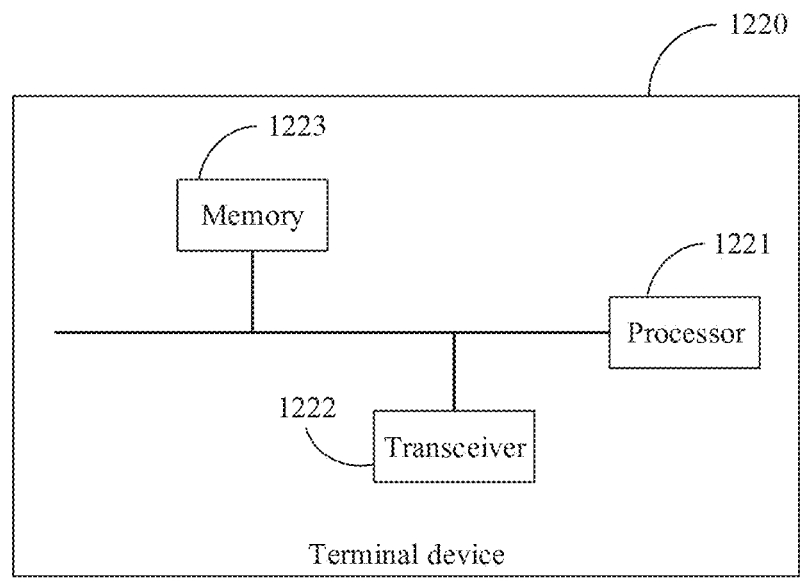
FIG. 11 is a schematic diagram of a format of another enhanced PDU session container according to an embodiment of this application.
FIG. 12 is a schematic block diagram of a terminal device according to an embodiment of this application.

FIG. 9 shows a format of a PDU session container when a QFI length is 6 bits. This embodiment of this application provides a way of enhancing the PDU session container to adapt to QFIs of different lengths. For example, some bit information is added to the format of the PDU session container to distinguish QFIs of different lengths. In a possible implementation, based on an extended PDU type value in the PDU session container, there are different values for a PDU type field to correspond to QFIs of different lengths. For example, if the PDU type value is 0, it indicates that the QFI length is 6 bits. If the PDU type value is 1, it indicates that the QFI length is 10 bits. FIG. 10 shows a format of an enhanced PDU session container, where the PDU type value is 2 and a QFI length is 14 bits. In another possible implementation, information for indicating a QFI length is added to a spare field of the PDU session container. FIG. 11 shows a format of another enhanced PDU container, where four bits occupied by a spare field are used to indicate a QFI length. It should be understood that a QFI length indication may also be represented by using another quantity of bits in the spare field. In still another possible implementation, an extended PDU type value in the PDU session container is retained. For example, the value is still 0, and a spare field in FIG. 9 is used to correspond to a high-order bit of a QFI whose length is greater than 6 bits, a low-order bit of the QFI corresponds to a bit occupied by an existing QFI field in FIG. 9. For example, if the QFI length is 10 bits, 4 high-order bits correspond to bits occupied by the first byte spare in FIG. 9, and 6 low-order bits are corresponding to bits occupied by QoS Flow Identifier in FIG. 9. For example, if the QFI value is 11000000, then 4 high-order bits are 1111, corresponding to the bits occupied by the first byte spare in FIG. 9, and 6 low-order bits are 100000, corresponding to the bits occupied by the QoS Flow Identifier field in FIG. 9.

According to the foregoing operations, the CN device can determine, based on a service requirement and/or a policy and charging control rule of the PDU session, a QFI length, and notify the RAN device and the terminal of the QFI length, so that a QFI field of an appropriate length is carried during data transmission between the CN device and the RAN device and between the RAN device and the terminal device. This avoids resource waste, and improves data transmission efficiency.

Embodiment 2

After a PDU session of a terminal device is established, in a communication process, as service changes, a quantity of QoS flows included in the PDU session may change. For example, when an initial PDU session of a terminal device is established, the PDU session may include hundreds of QoS flows, and QFIs with a relatively long bit length (for example, a length of 10 bits) needs to be used. As service changes, a quantity of QoS flows in the PDU session gradually decreases to dozens of QoS flows. Then, only QFIs of a relatively short bit length (for example, a length of 6 bits) need to be used. In this case, a CN device, a RAN device, and the terminal device need to update the QFI length, and map a QFI of a current QoS flow from a previous QFI of a first length to an updated QFI of a second length.

Figure 8:
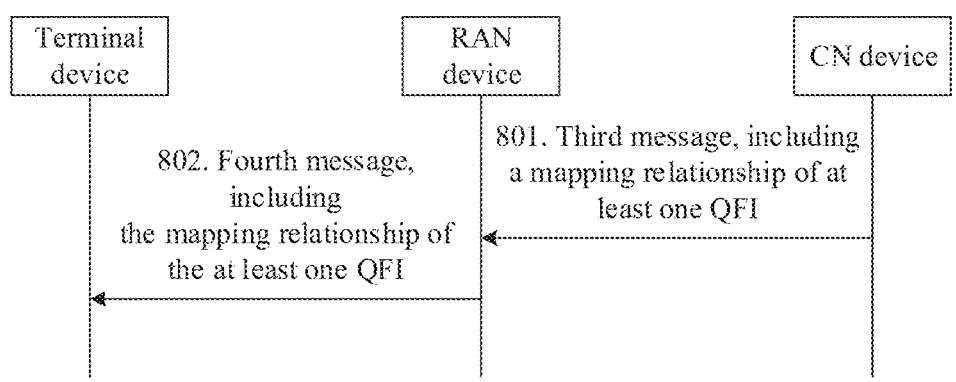
FIG. 8 is a schematic flowchart of a method for updating a QFI length according to an embodiment of this application.

FIG. 8 shows a schematic flowchart of a method for updating a QFI length according to an embodiment of this application. It should be understood that FIG. 8 is the schematic flowchart of the method for configuring the QFI length according to this embodiment of this application, and shows detailed communication operations of the method. However, these operations are merely examples. Other operations or variations of the operations in FIG. 8 may be further performed in this embodiment of this application. In addition, the operations in FIG. 8 may be separately performed in a sequence different from that shown in FIG. 8, and not all the operations in FIG. 8 may be necessarily performed. The method 800 may be applied to a scenario in which a PDU session of a terminal device is updated shown in FIG. 2. The procedure includes the following operations.

S801. A CN device sends a third message to a RAN device, where the third message includes a mapping relationship of one or more QFIs.

The CN device determines, based on a change of a service requirement and/or a policy and charging control rule of a PDU session of a terminal device, that a length of a QFI used for the PDU session established for the terminal device needs to change, for example, from a length of 10 bits to a length of 6 bits. For a QoS flow in the PDU session, the CN device needs to update a QFI of a first length previously used for the QoS flow to a QFI of a second length, and to notify the RAN device of a mapping relationship between the previous QFI of the first length and the updated QFI of the second length by using signaling, so that the RAN device can correctly parse a data packet of the QoS flow received from the CN device. For example, for a QoS flow, before the CN device determines to change a QFI length, a previous QFI length of the QoS flow is 10 bits, and a value of the previous QFI length is "100101101". After the CN device determines to update the QFI length to 6 bits and configure an updated QFI of the QoS flow as "101001", the CN device needs to notify the RAN device of a mapping relationship between the previous QFI of a first length and the updated QFI of a second length of the QoS flow, namely, the mapping relationship from "1000101" to "101001". It should be understood that when the PDU session includes a plurality of QoS flows, the third message includes a mapping relationship between a plurality of QFIs corresponding to the plurality of QoS flows. Previous QFIs of the QoS flows may have a same length or different lengths, and updated QFIs may have a same length or different lengths. Optionally, the CN device may further map a plurality of QoS flows before the update to one updated QoS flow, or map one QoS flow before the update to a plurality of updated QoS flows. For the foregoing example, in the former case, the CN device maps a plurality of QFIs of a length of 10 bits to one QFI of a length of 6 bits. In the latter case, the CN device maps one QFI of a length of 10 bits to a plurality of QFIs of a length of 6 bits.

Optionally, the third message further includes length information of one or more QFIs. It should be understood that the mapping relationship of the one or more QFIs are applied to one or more established QoS flows. The length information of the one or more QFIs is applied to one or more new QoS flows that need to be established. Further, an implementation of the length information of the one or more QFIs is similar to the description in step 501. Details are not described herein again.

It should be understood that in this step, the QFI mapping relationship that is included in the third message may be applied to both uplink transmission and downlink transmission of the QoS flow at the same time, or applied to uplink transmission and downlink transmission separately. Similarly, the QFI length information that is included in the third message may be applied to both uplink transmission and downlink transmission of the QoS flow at the same time, or applied to uplink transmission and downlink transmission of the QoS flow separately.

In this step, the third message is used for the CN device to indicate the RAN device to modify the PDU session for the terminal device. Optionally, the third message may be a PDU session resource modification request message, or the like.

S802. The RAN device sends a fourth message to the terminal device, where the fourth message includes the mapping relationship of the one or more QFIs.

The RAN device obtains, from the CN device, the QFI mapping relationship of the one or more QoS flows of the terminal device, and the RAN device needs to notify the terminal device of the QFI mapping relationship of the one or more QoS flows by using signaling, so that the terminal device can correctly parse a DRB data packet that carries a QoS flow received from the RAN device and/or send, to the RAN device, a DRB data packet that carries a QoS flow and that can be correctly parsed.

Similar to the implementation in step 801, for a QoS flow, the RAN device notifies the terminal device of a mapping relationship between a previous QFI of a first length and an updated QFI of a second length of the QoS flow by using signaling.

Optionally, the fourth message includes the length information of the one or more QFIs. The length information of the one or more QFIs is applied to one or more new QoS flows that need to be established.

In this step, the fourth message is used for the RAN device to reconfigure an RRC connection for the terminal device. Optionally, the fourth message may be an RRC reconfiguration message, an RRC connection resume message, or the like.

In addition, in a CU-DU application scenario, after obtaining the QFI mapping relationship from the CN device, a CU-CP notifies, by using signaling (for example, an SDAP configuration message), a CU-UP of QFI mapping relationship of a corresponding QoS flow.

According to the foregoing operations, the QFI with the updated length is determined to be used when data is transmitted between the terminal device and the RAN device, and between the RAN device and the CN device. Optionally, after the terminal device receives the updated QFI from the RAN device, an RRC layer or an SDAP layer of the terminal device may notify a PDCP layer of the updated QFI length of each QoS flow of a corresponding PDU session, so that the PDCP layer knows content on which encryption/decryption and header compression/header decompression are performed.

According to the foregoing operations, the CN device can determine, based on a change of a service requirement and/or a policy and charging control rule of the PDU session, the updated QFI length, and notify the RAN device and the terminal device of the mapping relationship between the previous QFI and the updated QFI of each QoS flow, so that the updated QFI is carried during data transmission between the CN device and the RAN device, and between the RAN device and the terminal device. In this way, continuity of data transmission is maintained.

During data transmission, each device encapsulates a data packet based on the updated QFI of each QoS flow. For example, for downlink data transmission of a QoS flow, a GTP-U format corresponding to an updated QFI length is used for downlink data of the QoS flow sent by the CN device to the RAN device on an NG-U tunnel. For downlink transmission of the QoS flow between the RAN device and the terminal device, in a possible implementation, after determining that downlink data of the QoS flow that uses a previous QFI of a first length has been correctly received by the terminal device, the RAN device sends a fourth message to notify the terminal device, and continues to transmit the downlink data of the QoS flow by using a QFI of a second length. In this case, a mapping relationship between the QoS flow and a DRB remains unchanged. In other words, the QoS flow is mapped to a same DRB regardless of whether the previous QFI of the first length or the updated QFI of the second length is used. In another possible implementation, the RAN device configures, in the fourth message, a new second DRB for the QoS flow for which the QFI is updated to the second length, and reserves a first DRB to which the QoS flow that uses the previous QFI of the first length is mapped. In this case, the mapping relationship between the QoS flow and the DRB changes. In other words, the QoS flow is mapped to one DRB when the previous QFI of the first length is used, and is mapped to another DRB when the updated QFI of the second length is used. The RAN device sends an end indication on a first DRB, and continues to transmit the downlink data of the QoS flow on a second DRB. When receiving a downlink data packet on the first DRB, the terminal device may add, based on a correspondence of the QFI in the fourth message, the updated QFI of the second length to the data packet when an SDAP layer of the terminal device submits the data packet to an upper layer (for example, an application layer). It should be understood that the end indication may be indicated by using a control PDU at the SDAP layer, or may be indicated by using a PDU without a data packet at the SDAP layer, or may be indicated by using a control PDU at the PDCP layer. The control PDU at the SDAP layer may further carry the previous QFI of the first length, or the PDU without the data packet may further carry the previous QFI of the first length.

For example, for uplink data transmission of one QoS flow, after the terminal device receives the fourth message sent by the RAN device, the RRC layer of the terminal device may notify an upper layer (for example, an application layer) of the update of the corresponding QFI, and the RRC layer of the terminal device may also notify the SDAP layer of the update of the corresponding QFI. If the RAN device reserves, for the terminal device, the first DRB to which the QoS flow is mapped when the QoS flow uses the previous QFI of the first length, and configures the new second DRB for the QoS when the QoS flow uses the updated QFI of the second length, the SDAP layer of the terminal device sends one end indication on the first DRB, and continues to transmit uplink data of the QoS flow on the second DRB. It should be understood that the end indication may be indicated by using a control PDU at the SDAP layer, or may be indicated by using a PDU without a data packet at the SDAP layer, or may be indicated by using a control PDU at the PDCP layer. The control PDU at the SDAP layer may further carry the previous QFI of the first length, or the PDU without the data packet may further carry the previous QFI of the first length. In addition, when the RAN device receives an uplink data packet on the first DRB, the RAN device sends, based on the third message sent by the CN device, the data packet on the NG-U tunnel to the CN device in the GTP-U format that corresponds to the updated QFI.

The foregoing describes the method embodiments of this application in detail with reference to the embodiments. The following describes apparatus embodiments of this application in detail with reference to FIG. 12 to FIG. 17. It should be understood that the apparatus embodiments and the method embodiments correspond to each other. For similar descriptions, refer to the method embodiments. It should be noted that the apparatus embodiments may be used in conjunction with the foregoing methods, or may be independently used.

FIG. 12 is a schematic block diagram of a communication apparatus 1200 according to an embodiment of this application. The communication apparatus 1200 may correspond to (for example, may be configured on or may be) the terminal device described in the foregoing method embodiments. The communication apparatus 1200 may include a processor 1201 and a transceiver 1202. The processor and the transceiver are communicatively connected. Optionally, the communication apparatus 1200 further includes a memory 1203. The memory 1203 is communicatively connected to the processor 1201. Optionally, the processor 1201, the memory 1203, and the transceiver 1202 may be communicatively connected. The memory 1203 may be configured to store an instruction. The processor 1201 is configured to execute the instruction stored in the memory, to control the transceiver 1202 to send information or a signal. The processor 1201 and the transceiver 1202 are separately configured to perform actions or processing processes performed by the terminal device in the foregoing method embodiments. Herein, to avoid repetition, detailed descriptions thereof are omitted.

Figure 13:
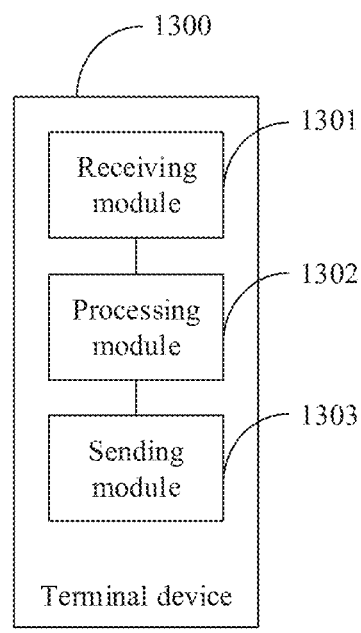
FIG. 13 is another schematic block diagram of a terminal device according to an embodiment of this application.

FIG. 13 is a schematic block diagram of a communication apparatus 1300 according to an embodiment of this application. The communication apparatus 1300 may correspond to (for example, may be configured on or may be) the terminal device described in the foregoing method embodiments. The communication apparatus 1300 may include a receiving module 1301, a processing module 1302, and a sending module 1303. The processing module 1302 is in communication connection with the receiving module 1301 and the sending module 1303. The modules or units in the communication device 1300 are separately configured to perform actions or processing processes performed by the terminal device in the foregoing method embodiments. Herein, to avoid repetition, detailed descriptions thereof are omitted.

Figure 14:
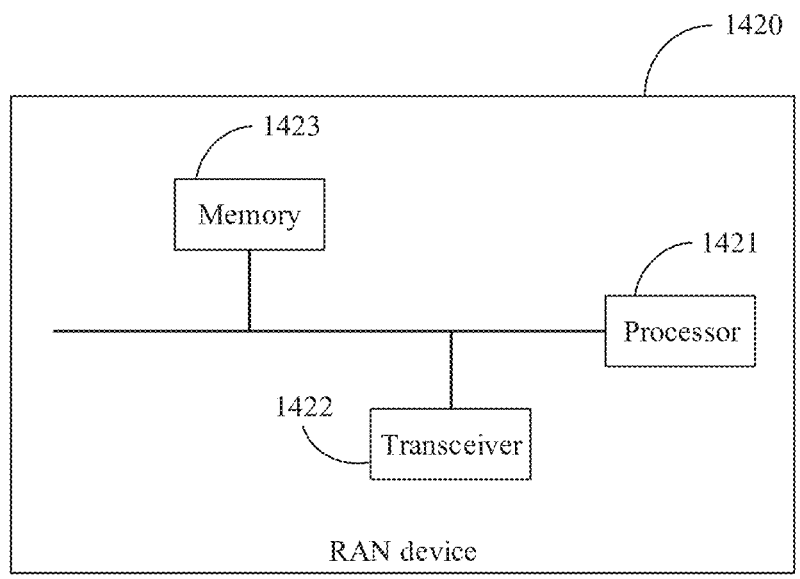
FIG. 14 is a schematic block diagram of a RAN device according to an embodiment of this application.

FIG. 14 is a schematic block diagram of a communication apparatus 1400 according to an embodiment of this application. The communication apparatus 1400 may correspond to (for example, may be configured on or may be) the RAN device described in the foregoing method embodiments. The communication apparatus 1400 may include a processor 1401 and a transceiver 1402. The processor and the transceiver are communicatively connected. Optionally, the communication apparatus 1400 further includes a memory 1403. The memory 1403 is communicatively connected to the processor 1401. Optionally, the processor 1401, the memory 1403, and the transceiver 1402 may be communicatively connected. The memory may be configured to store an instruction. The processor is configured to execute the instruction stored in the memory, to control the transceiver to 702 send information or a signal. The processor 701 and the transceiver 702 are separately configured to perform actions or processing processes performed by the RAN device in the foregoing method embodiments. Herein, to avoid repetition, detailed descriptions thereof are omitted.

Figure 15:
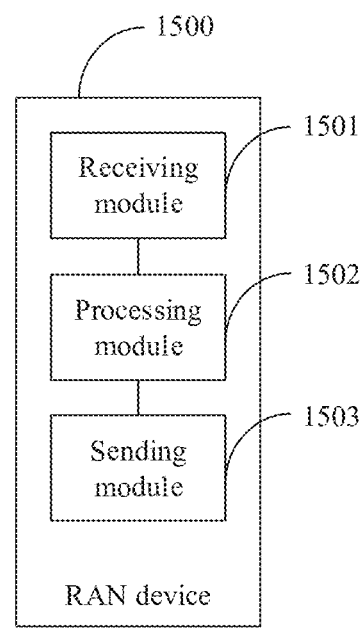
FIG. 15 is another schematic block diagram of a RAN device according to an embodiment of this application.

FIG. 15 is a schematic block diagram of a communication apparatus 1500 according to an embodiment of this application. The communication apparatus 1500 may correspond to (for example, may be configured on or may be) the RAN device described in the foregoing method embodiments. The communication apparatus 1500 may include a receiving module 1501, a processing module 1502, and a sending module 1503. The processing module 1502 is in communication connection with the receiving module 1501 and the sending module 1503. The modules or units in the communication device 1500 are separately configured to perform actions or processing processes performed by the RAN device in the foregoing method embodiments. Herein, to avoid repetition, detailed descriptions thereof are omitted.

Figure 16:
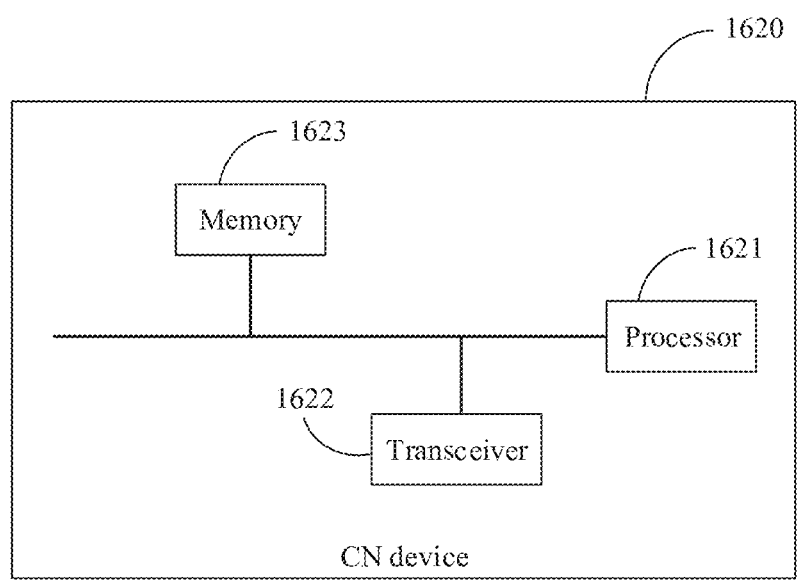
FIG. 16 is a schematic block diagram of a CN device according to an embodiment of this application.

FIG. 16 is a schematic block diagram of a communication apparatus 1620 according to an embodiment of this application. The communication apparatus 1620 may correspond to (for example, may be configured on or may be) the CN device described in the foregoing method embodiments. The communication apparatus 1620 may include a processor 1621 and a transceiver 1622. The processor and the transceiver are communicatively connected. Optionally, the communication apparatus 1620 further includes a memory 1623. The memory 1623 is communicatively connected to the processor 1621. Optionally, the processor 1621, the memory 1623, and the transceiver 1622 may be communicatively connected. The memory 1623 may be configured to store an instruction. The processor 1621 is configured to execute the instruction stored in the memory, to control the transceiver 702 to send information or a signal. The processor 701 and the transceiver 702 are separately configured to perform actions or processing processes performed by the CN device in the foregoing method embodiments. Herein, to avoid repetition, detailed descriptions thereof are omitted.

Figure 17:
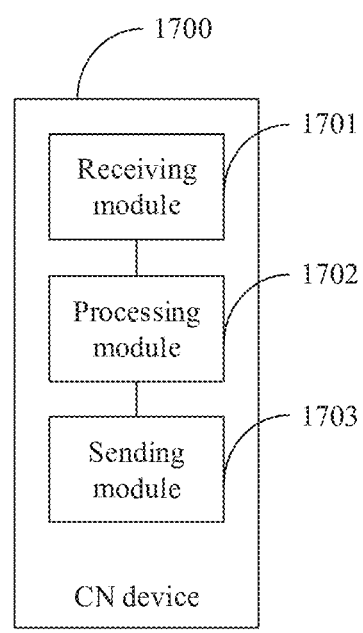
FIG. 17 is another schematic block diagram of a CN device according to an embodiment of this application.

FIG. 17 is a schematic block diagram of a communication apparatus 1700 according to an embodiment of this application. The communication apparatus 1700 may correspond to (for example, may be configured on or may be) the CN device described in the foregoing method embodiments. The communication apparatus 1700 may include a receiving module 1701, a processing module 1702, and a sending module 1703. The processing module 1702 is in communication connection with the receiving module 1701 and the sending module 1703. The modules or units in the communication device 1700 are separately configured to perform actions or processing processes performed by the CN device in the foregoing method embodiments. Herein, to avoid repetition, detailed descriptions thereof are omitted.

It should be understood that the processors (1201, 1401, and 1621) in the apparatus embodiments of this application may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof.

The memories (1203, 1403 and 1623) in the apparatus embodiments of this application may be a volatile memory such as a random-access memory (RAM); or may be a nonvolatile memory such as a read-only memory (ROM), a flash memory, a hard disk drive (HDD), or a solid-state drive (SSD); or may be a combination of the foregoing types of memories.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this patent application shall be subject to the protection scope of the claims.

What is claimed is:

1. A method, comprising:
   determining, by a core network (CN) device, a quality of service (QoS) flow identifier (QFI) length of a QFI from a plurality of QFI lengths, the QFI associated with downlink transmission of a QoS flow when a protocol data unit (PDU) session is established or modified for a terminal device, wherein the CN device and a radio access network (RAN) device are separate devices connected through a next generation (NG) interface, and wherein the CN device includes at least one of a mobility management function (AMF), a session management function (SMF), or a user plane network element (UPF);
   sending, by the CN device to the RAN device over the NG interface, a first message, wherein the first message comprises QFI length information of the QFI indicating the QFI length determined by the CN device, wherein the QFI length information indicates at least one of: a length value of the QFI, a value range of the QFI, or a length class of the QFI, and
      wherein the QFI length indicated by the QFI length information of the QFI is a PDU session-specific QFI length, and the PDU session-specific QFI length is used for all QoS flows in the PDU session, or
      wherein the QFI length indicated by the QFI length information of the QFI is a QoS flow-specific QFI length, and different QoS flows in the PDU session use different QFI lengths; and
   sending, by the CN device, a third message to the RAN device, the third message includes a QFI mapping relationship of a plurality of QFIs including the QFI, wherein the QFI mapping relationship includes a correspondence between the QFI and the QFI length of the QFI used by at least one QoS flow after the PDU session is modified, and wherein the QFI mapping relationship further includes a second correspondence between a second QFI and a second length used by the at least one QoS flow in the PDU session before the PDU session is modified.

2. The method according to claim 1, wherein QFIs of all QoS flows or of some QoS flows in one PDU session correspond to one piece of the QFI length information.

3. The method according to claim 1, wherein the first message is one of a PDU session resource establishment request message, a PDU session resource update request message, or an initial context establishment message.

4. The method of claim 1, wherein the first message including the QFI length information is sent separately from any data radio bearer (DRB) packet.

5. The method of claim 1, the determining comprising:
determining, by the CN device, the QFI length of the QFI based on at least one of a service requirement or a policy and charging control rule of the PDU session.

6. The method of claim 1, wherein the QoS flow-specific QFI length is different from a second QoS flow-specific QFI length for a second QoS flow in the PDU session.

7. The method of claim 6, wherein the QoS flow-specific QFI length and the second QoS flow-specific QFI length are both different from a third QoS flow-specific QFI length for a third QoS flow in the PDU session.

8. The method of claim 1, wherein the QFI length information is in a header of the first message, the header being different from a service data adaptation protocol (SDAP) header.

9. A method, comprising:
receiving, by a radio access network (RAN) device from a core network (CN) device, a first message, wherein the first message comprises QFI length information of a quality of service (QoS) flow identifier (QFI) associated with downlink transmission of a QoS flow, wherein the CN device and the RAN device are separate devices connected through a next generation (NG) interface, and wherein the CN device includes at least one of a mobility management function (AMF), a session management function (SMF), or a user plane network element (UPF), wherein the QFI length information indicates at least one of: a length value of the QFI, a value range of the QFI, or a length class of the QFI;
sending, by the RAN device to a terminal device, a second message, wherein the second message comprises the QFI length information of the QFI indicating a QFI length determined by the CN device from a plurality of QFI lengths,
wherein the QFI length indicated by the QFI length information of the QFI is a PDU session-specific QFI length, and the PDU session-specific QFI length is used for all QoS flows in a PDU session, or
wherein the QFI length indicated by the QFI length information of the QFI is a QoS flow-specific QFI length, and different QoS flows in the PDU session use different QFI lengths; and
receiving, by the RAN device, a third message from the CN device, the third message includes a QFI mapping relationship of a plurality of QFIs including the QFI, wherein the QFI mapping relationship includes a correspondence between the QFI and the QFI length of the QFI used by at least one QoS flow after the PDU session is modified, and wherein the QFI mapping relationship further includes a second correspondence between a second QFI and a second length used by the at least one QoS flow in the PDU session before the PDU session is modified.

10. The method according to claim 9, wherein QFIs of all QoS flows or of some QoS flows in one protocol data unit (PDU) session correspond to one piece of the QFI length information.

11. The method according to claim 9, wherein the first message is one of a PDU session resource establishment request message, a PDU session resource update request message, or an initial context establishment message.

12. The method according to claim 9, wherein the second message is one of a radio resource control (RRC) connection re-establishment request message, an RRC reconfiguration message, or an RRC connection resume message.

13. A system, comprising:
a core network (CN) device; and
a radio access network (RAN) device,
wherein the CN device and the RAN device are separate devices connected through a next generation (NG) interface, and wherein the CN device includes at least one of a mobility management function (AMF), a session management function (SMF), or a user plane network element (UPF),
wherein the CN device comprises at least one first processor and a first non-transitory computer-readable storage medium coupled with the at least one first processor and configured to store a first program including first instructions which, when being executed by the at least one first processor, cause the CN device to:
determine a quality of service (QoS) flow identifier (QFI) length of a QFI from a plurality of QFI lengths, the QFI associated with downlink transmission of a QoS flow when a protocol data unit (PDU) session is established or modified for a terminal device,
send, to a RAN device, a first message, wherein the first message comprises QFI length information of the QFI, wherein the QFI length information indicates at least one of: a length value of the QFI, a value range of the QFI, or a length class of the QFI, and
send a third message to the RAN device, the third message includes a QFI mapping relationship of a plurality of QFIs including the QFI, wherein the QFI mapping relationship includes a correspondence between the QFI and the QFI length used by at least one QoS flow after the PDU session is modified, and wherein the QFI mapping relationship further includes a second correspondence between a second QFI and a second length used by the at least one QoS flow in the PDU session before the PDU session is modified; and
wherein the RAN device comprises at least one second processor and a second non-transitory computer-readable storage medium coupled with the at least one second processor and configured to store a second program including second instructions which, when being executed by the at least one second processor, cause the RAN device to:
receive, from the CN device, the first message;
send a second message to the terminal device, wherein the second message comprises the QFI length information of the QFI indicating the QFI length determined by the CN device,
wherein the QFI length indicated by the QFI length information of the QFI is a PDU session-specific QFI length, and the PDU session-specific QFI length is used for all QoS flows in the PDU session, or
wherein the QFI length indicated by the QFI length information of the QFI is a QoS flow-specific QFI length, and different QoS flows in the PDU session use different QFI lengths; and
receive the third message from the CN device.

14. The system according to claim 13, wherein QFIs of all QoS flows or some QoS flows in one PDU session correspond to one piece of the QFI length information.

15. The system according to claim 13, wherein the first message is one of a PDU session resource establishment request message, a PDU session resource update request message, or an initial context establishment message.

16. The system according to claim 13, wherein the second message is one of a radio resource control (RRC) connection re-establishment request message, an RRC reconfiguration message or an RRC connection resume message.

\* \* \* \* \*